United States Patent [19]

Iizuka et al.

[11] 4,032,255

[45] June 28, 1977

[54] TURBINE ROTOR HOLDING DEVICE

[75] Inventors: Nobuyuki Iizuka; Yasuhiko Otawara; Satoshi Ninomiya, all of Hitachi, Japan

[73] Assignee: Hitachi, Ltd., Japan

[22] Filed: Feb. 3, 1975

[21] Appl. No.: 546,808

[30] Foreign Application Priority Data

Feb. 6, 1974 Japan ............................. 49-14464

[52] U.S. Cl. .......................... 415/219 R; 206/319
[51] Int. Cl.[2] .................. F01D 25/24; B65D 85/68
[58] Field of Search ............... 415/219 R; 206/318, 206/319; 248/119 R; 308/1 A, 1 R, 162; 417/360; 70/182, 183, 184

[56] References Cited

UNITED STATES PATENTS

| | | | |
|---|---|---|---|
| 513,367 | 1/1894 | Parsons | 308/162 |
| 1,386,491 | 8/1921 | Brown | 308/162 |
| 2,460,797 | 2/1949 | Allington | 206/319 |
| 2,749,190 | 6/1956 | Ball | 308/1 R |
| 3,927,763 | 12/1975 | Strub et al. | 206/319 |

FOREIGN PATENTS OR APPLICATIONS 1,101,832   10/1955   France ............................ 206/318

*Primary Examiner*—Carlton R. Croyle
*Assistant Examiner*—L. T. Casaregola
*Attorney, Agent, or Firm*—Craig & Antonelli

[57] ABSTRACT

A rotor fixing device for turbines comprising rotor support means independent of the bearing and including an inner ring member split into at least two sections and formed on its inner peripheral surface with grooves complementary with packing teeth formed on an outer peripheral surface of the turbine rotor, and an outer ring member split into at least two sections and secured to a turbine casing for supporting the inner ring member, and means secured to stationary members of the turbine and adapted to be inserted into a space defined between a rotor wheel and a packing case head for constraining axial movement of the turbine rotor. The rotor support means is disposed adjacent each end portions of the turbine rotor. The turbine rotor can be fixedly supported in place in an assembled condition during transportation of the turbine. The rotor fixing device is removed from the turbine after completion of transportation thereof.

8 Claims, 6 Drawing Figures

TURBINE ROTOR HOLDING DEVICE

BACKGROUND OF THE INVENTION

The present invention relates to a rotor holding device for turbines adapted for use during transportation of the turbines.

Heretofore, when a turbine is transported in an assembled condition, it has been a usual practice to support a rotor of the turbine through the bearings therefor and fixedly place the turbine on a support framework made of a wooden or iron material. Such method of transportation in the prior art has a disadvantage in that it is not applicable to transportation of turbines having rotors of heavy weight since the rotor of the turbine is supported through the bearings therefor with the result that the portions of the bearings and rotor which are brought into contact with one another are in danger of suffering damage due to vibrations occuring during transportation. Therefore, the turbines which can be actually transported in an assembled condition by the prior art method are by far smaller in weight and smaller in bulk than those being able to be transported by means of a trailer or a freight car.

SUMMARY OF THE INVENTION

The present invention is contemplated with a view to improving the aforementioned disadvantage of the prior art. To this end, the present invention provides a rotor holding device for turbines in which damages to the contact portions of the bearings and the turbine rotor are avoided and a turbine of larger size than those which have hitherto been handled by the prior art method can be transported in an assembled condition.

According to the present invention, there is provided a rotor holding means independently of bearings for the rotor which means can be detachably mounted so as to fixedly support the rotor during transportation, and can be removed after completion of transportation of a turbine assembly. According to the present invention, there is also provided means for preventing the rotor from axially moving in the turbine housing during transportation.

DESCRIPTION OF THE PREFERRED EMBODIMENT

Figure 1:
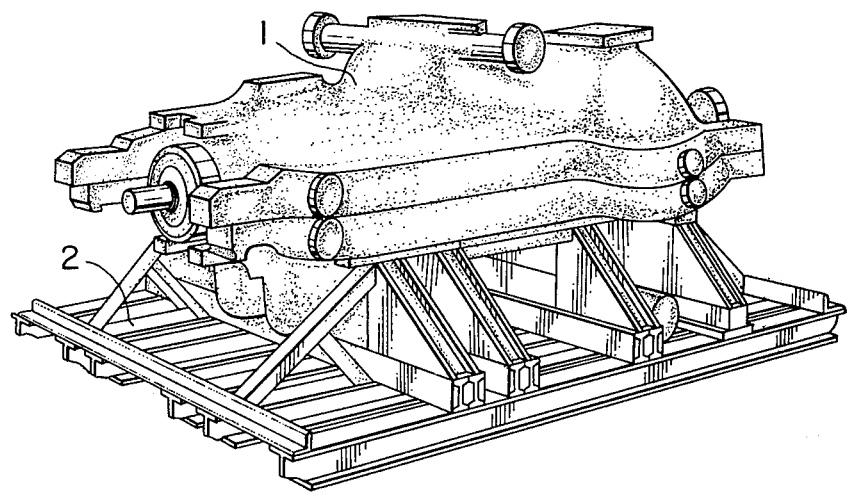
FIG. 1 is a perspective view of the steam turbine showing one embodiment of the present invention.
Figure 2:
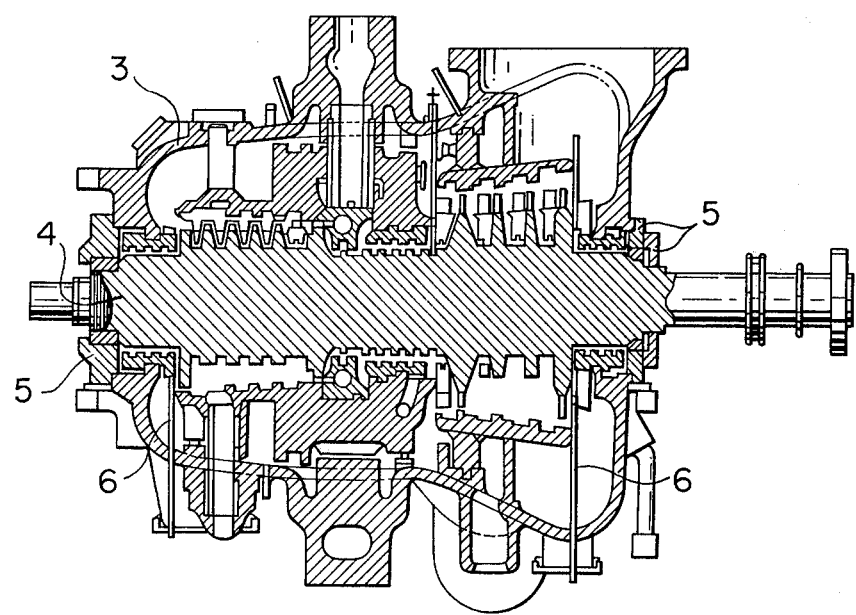
FIG. 2 is a vertical sectional view of the steam turbine shown in FIG. 1 with the support framework for use during transportation being removed.

On embodiment of the invention will now be described with reference to the accompanying drawings. Referring to FIG. 1, there is shown a steam turbine assembly 1 supported on a support framework 2 for transportation in an assembled condition. The support framework 2 is adapted to absorb vibrations of the steam turbine 1 during transportation.

The steam turbine 1 includes a turbine rotor 4 which is fixedly supported through a rotor fixing assembly 5 of the rotor holding means on an outer turbine casing 3. Further turbine rotor 4 is axially constrained by a rotor axial fixing device 6, so that the rotor is prevented from axially moving in opposite directions. Both the rotor fixing assembly 5 and the rotor axial fixing device 6 are provided at each end portion of the turbine rotor 4.

Figure 3:
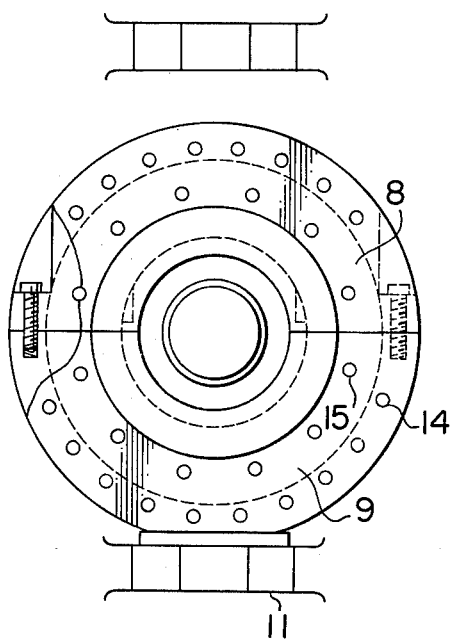
FIG. 3 is an end view of the rotor fixing means according to the present invention, as seen axially thereof.
Figure 4:
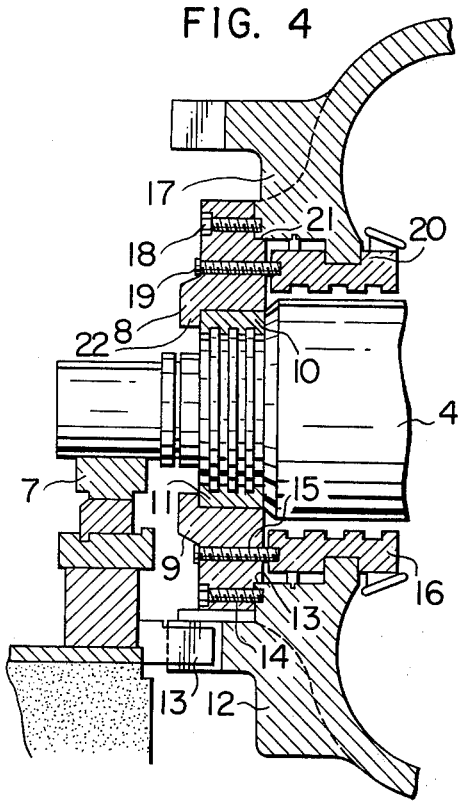
FIG. 4 is a fragmentary vertical sectional view of showing a portion of the steam turbine assembly in which the rotor fixing means is assembled.

The rotor fixing assembly 5 is shown in detail in FIGS. 3 and 4. As shown, the turbine rotor 4 is supported at one end thereof by a bearing 7 disposed outside of the steam turbine 1. The rotor fixing assembly 5 is mounted in the turbine 1 after a partition plate, inner turbine casing, outer turbine casing, packing and packing case head have been assembled. The rotor fixing assembly 5 serving as rotor support means comprises an outer ring member including an outer ring upper-half and lower half portions 8 and 9, and an inner ring member including an inner ring upper-half and lower half portions 10 and 11.

In mounting the rotor fixing assembly 5 in the turbine 1, the outer ring lower-half portion 9 is placed on a socket and spigot joint portion 13 of a lower-half portion 12 of an outer turbine casing and secured in place by means of bolts 14 to the portion 12 which serves as a stationary member. Then, the outer ring lower-half portion 9 is secured by means of bolts 15 to a lower portion 16 of a packing case head which also serves as a stationary member. As the portion 11 slides along the horizontal surfaces of the outer ring lower-half portion 9, the inner ring lower-half portion 11 is fitted into a gap defined between the outer ring lower-half portion 9 and the rotor 4, and held in position so that it may not project upwardly from the horizontal surfaces of the outer ring lower-half portion 9. Thereafter, the inner ring upper-half portion 10 is fitted over the rotor 4 and inter connected to the lower-half portion 11 by means of bolts (not shown). The inner ring upper-half and lower half portions 10 and 11 are formed with grooves on their inner half-cyrindrical surfaces contacting the associated packing surface of the rotor 4, which grooves are complementary with teeth formed on the packing surface of the rotor 4, so that the teeth may be received in the grooves to thereby be protected against any damage from outside. The outer ring upper-half portion 8 is axially fitted in engaging relation to the inner ring upper-half portion 10 and an upper-half portion 17 of an outer turbine casing.

Then, the outer ring upper-half portion 8 is secured by means of bolts 18 to the upper-half portion 17 of the outer turbine casing which portion serves as a stationary member and by means of bolts 19 to an upper portion 20 of the packing case head which portion also serves as a stationary member. In this manner, the turbine rotor 4 is fixedly supported through the rotor fixing assembly 5 on the outer turbine casing, and then the bearing 7 is removed, thus being ready for transportation. The outer ring upper-half portion 8 is stepped as at 21 in a portion thereof which contacts the outer casing upper-half portion 17, and formed with a projection 22 for preventing axial movement of the inner ring upper-half portion 10.

After completion of the transportation of the turbine, the aforementioned operation is performed in the reverse order to thereby removed the rotor fixing assembly 5 from the turbine. Here, it is to be understood that, while the foregoing description is done is association with the lefthand end portion of the turbine rotor 4, similar arrangement and procedure hold as to the righthand end portion of the rotor.

Figure 5:
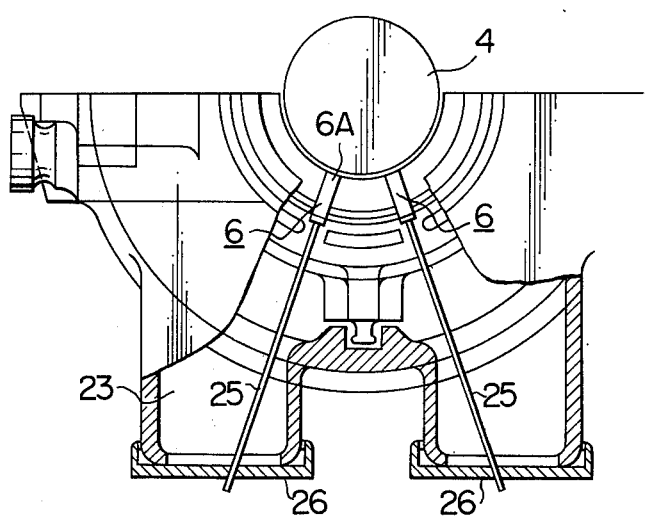
FIG. 5 is a fragmentary end view, showing the turbine assembly as seen axially thereof, in which means for the prevention of axial movement of the rotor is assembled.
Figure 6:
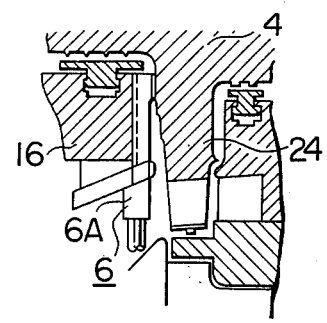
FIG. 6 is an enlarged view of a portion of the turbine assembly shown in FIG. 2.

In FIGS. 5 and 6 there is shown in detail the rotor axial fixing device 6 comprising a pair of axial movement restraining members 6A adapted to be inserted through exhaust ports 23. The axial movement restraining members 6A are inserted into a space defined between a rotor wheel 24 and a lower portion 16 of a packing case head to prevent movement of the rotor 4 toward the packing case head. The pair of the axial movement restraining members 6A each include a support rod 25 of a suitable length, which rods 25 facilitate mounting and demounting the restraining members 6A and prevent dislodging of the restraining members 6A from the rotor 4 since the rods are being secured to exhaust port covers 26 which serve as stationary members. When the turbine is installed after being transported, the restraining members 6A can be demounted simultaneously with removing the exhaust port covers 26. This ensures that the rotor axial fixing device 6 is demounted without fail. The exhaust port covers 26 adapted to prevent entering of foreign matter through the ports 25 into the turbine are removed when the turbine is installed.

From the foregoing description, it will be appreciated that a rotor fixing means according to the present invention is provided independently of bearings for a turbine rotor, so that there is no possibility of the bearings and turbine rotor being damaged due to the contact thereof during transportation, thereby making it possible to transport a larger sized turbine than can be by the prior art method in an assembled condition. Therefore, according to the present invention, it is possible to assemble turbines of a large size in a wellequipped plant, thereby contributing to improving the quality of turbines.

What is claimed is:

1. A device for holding a turbine rotor of a steam turbine of the type having turbine wheels provided on a turbine rotor, a turbine casing through which, at the end portions thereof, the turbine rotor extends, and bearing means mounted at the turbine rotor; the improvement comprising means for holding the turbine rotor including an inner ring, an outer ring for supporting said inner ring, said inner ring being provided with a surface complementary to a portion of the turbine rotor constituting a steam leakage preventing means disposed between the location of said bearing means and the turbine casing so as to protect said stream leakage preventing means when fitted thereon; and fastener means for securing said outer ring to the turbine casing and adapted to be removed during operation of the steam turbine, whereby the turbine rotor can be directly supported on the turbine casing when said bearing means are not mounted in place.

2. A device according to claim 1, wherein said turbine rotor holding means are also secured to the turbine casing.

3. A device according to claim 1, wherein said outer ring is provided with projections for preventing axial movement of said inner ring.

4. A device according to claim 1, wherein said inner and outer rings consist of upper half and lower half portions, respectively.

5. A device for holding a turbine rotor of a steam turbine of the type having a turbine casing, turbine wheels provided on the turbine rotor, packing case heads each secured to the turbine casing at the respective end portions thereof through which the turbine rotor extends, bearing means for being mounted on the end portions of the turbine rotor disposed outside of the turbine casing during operation of the turbine casing, and steam leakage preventing teeth formed on the turbine rotor and disposed adjacent to said respective packing case heads and between the respective packing case heads and the bearing means; said device comprising an inner ring member having teeth for engaging said teeth of the turbine rotor, an outer ring member for holding said inner ring member, and means for securing said outer ring member to the turbine casing, wherein the inner ring member, the outer ring member and the outer ring securing means are removable from the turbine casing in operation of the steam turbine.

6. A device according to claim 5 wherein said outer ring member includes a projection for preventing axial movement of the inner ring member.

7. A device according to claim 5 further comprising means for securing said outer ring member to the respective packing case heads.

8. A device according to claim 5 wherein said outer ring member consists of upper half and lower half portions.

* * * * *